US010629882B2

(12) United States Patent
Kim

(10) Patent No.: US 10,629,882 B2
(45) Date of Patent: Apr. 21, 2020

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 14 days.

(21) Appl. No.: 13/933,182

(22) Filed: Jul. 2, 2013

(65) Prior Publication Data
US 2014/0205888 A1    Jul. 24, 2014

(30) Foreign Application Priority Data
Jan. 21, 2013  (KR) .................. 10-2013-0006659

(51) Int. Cl.
*H01M 2/20* (2006.01)
(52) U.S. Cl.
CPC ........ *H01M 2/206* (2013.01); *H01M 2220/20* (2013.01)
(58) Field of Classification Search
CPC ...................................... H01M 2/30
See application file for complete search history.

(56) References Cited

U.S. PATENT DOCUMENTS

| | | | |
|---|---|---|---|
| 8,178,235 B2 | 5/2012 | Cheon et al. | |
| 2008/0063929 A1 | 3/2008 | Byun et al. | |
| 2008/0199765 A1 | 8/2008 | Yoon et al. | |
| 2009/0075163 A1 | 3/2009 | Shevock et al. | |
| 2009/0162747 A1* | 6/2009 | Zhu | H01M 2/206 429/160 |
| 2010/0266889 A1 | 10/2010 | Kim | |
| 2011/0159353 A1* | 6/2011 | Byun | H01M 2/206 429/160 |
| 2011/0177381 A1 | 7/2011 | Oya et al. | |
| 2012/0121966 A1* | 5/2012 | Kim | H01M 10/0436 429/158 |

FOREIGN PATENT DOCUMENTS

| | | |
|---|---|---|
| JP | 2008-071733 A | 3/2008 |
| JP | 2011-150860 A | 8/2011 |

(Continued)

OTHER PUBLICATIONS

Korean Office Action dated May 23, 2016 in corresponding Korean Patent Application No. 10-2013-0006659.

(Continued)

*Primary Examiner* — Ula C Ruddock
*Assistant Examiner* — Thomas H. Parsons
(74) *Attorney, Agent, or Firm* — Lee IP Law, P.C.

(57) ABSTRACT

A battery module includes a plurality of overlapping rechargeable batteries arranged in one direction, each rechargeable battery including at least one terminal protruding outside, and a plurality of bus bars electrically connecting terminals of different rechargeable batteries of the plurality of rechargeable batteries, the bus bar including a bent band in surface contact with and electrically connected to a respective terminal.

20 Claims, 9 Drawing Sheets

(56) References Cited

FOREIGN PATENT DOCUMENTS

| | | | |
|---|---|---|---|
| JP | 2012038558 | * | 2/2012 |
| JP | 2012038558 A | * | 2/2012 |
| KR | 10 2006-0112034 A | | 10/2006 |
| KR | 10 2007-0043501 A | | 4/2007 |
| KR | 10-2009-0028422 A | | 3/2009 |
| KR | 10-2010-0114595 A | | 10/2010 |
| KR | 10-2011-0067027 A | | 6/2011 |

OTHER PUBLICATIONS

Korean Office Action dated Nov. 24, 2016 in corresponding Korean Patent Application No. 10-2013-0006659.

* cited by examiner

BATTERY MODULE

CROSS-REFERENCE TO RELATED APPLICATION

The present application claims priority under 35 U.S.C. § 119 to Korean Patent Application No. 10-2013-0006659, filed on Jan. 21, 2013, in the Korean Intellectual Property Office, and entitled: "Battery Module," which is incorporated by reference herein in its entirety.

BACKGROUND

1. Field

The described technology relates generally to a battery module for improving connectivity and durability of a bus bar.

2. Description of the Related Art

A large-capacity rechargeable battery is used as a motor driving power source, e.g., for electric vehicles or hybrid electric vehicles (HEVs). The large-capacity rechargeable battery is configured by providing a plurality of rechargeable batteries of a unit cell and connecting the rechargeable batteries in series. For example, the connection in series may have a configuration for connecting a positive terminal of a first rechargeable battery to a negative terminal of a second rechargeable battery through a first bus bar, and connecting the positive terminal of the second rechargeable battery to a negative terminal of a third rechargeable battery through a second bus bar.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a battery module with an improved degree of connection freedom of a bus bar and a terminal, as well as improved durability, by connecting the bus bar and the terminal without using welding or bolts.

An exemplary embodiment provides a battery module including a plurality of overlapping rechargeable batteries arranged in one direction, each rechargeable battery including at least one terminal protruding outside, and a plurality of bus bars electrically connecting terminals of different rechargeable batteries of the plurality of rechargeable batteries, the bus bar including a bent band in surface contact with and electrically connected to a respective terminal.

The terminal may include a terminal clamp defining a space between the terminal and the terminal clamp, the bent bar being inserted into the defined space to be electrically connected to the terminal.

The terminal clamp may include a first elastic piece extending from a first side of the terminal and bending to overlap the terminal, the first elastic piece pushing the bent band toward the terminal, and a second elastic piece extending from a second side of the terminal and bending to overlap the terminal, the second elastic piece pushing the bent band toward the terminal.

The bus bar may further include a bus bar clamp defining a space between the bent band and the bus bar clamp, the terminal being inserted into the defined space to be electrically connected to the bent band.

The bus bar clamp may include a first elastic piece extending from a first side of the bent band and bending to overlap the bent band, the first elastic piece pushing the terminal toward the bent band, and a second elastic piece extending from a second side of the bent band and bending to overlap the bent band, the second elastic piece pushing the terminal toward the bent band.

The terminal may include a band inserter defining a space between the terminal and the band inserter, the bent bar being inserted into the defined space to be electrically connected to the terminal, and a coupler inserted through the band inserter and the bent band.

The bus bar may further include a terminal inserter defining a space between the terminal and the terminal inserter, the terminal being inserted into the defined space to be electrically connected to the bent band, and a coupler inserted through the terminal inserter and the terminal.

An exemplary embodiment also provides a battery module including a plurality of overlapping rechargeable batteries arranged in one direction, each rechargeable battery including at least one terminal with a bent unit protruding outside, and a plurality of bus bars electrically connecting terminals of different rechargeable batteries of the plurality of rechargeable batteries, the bus bar being in surface contact with and electrically connected to a bent units of respective terminals.

The battery module may further include a coupler extending through the bent unit and the bus bar.

The coupler may be a rivet.

BRIEF DESCRIPTION OF THE DRAWINGS

Features will become apparent to those of ordinary skill in the art by describing in detail exemplary embodiments with reference to the attached drawings, in which.

DETAILED DESCRIPTION

A battery module according to exemplary embodiments will now be described with reference to accompanying drawings. Exemplary embodiments are not limited to the embodiments described hereinafter but may be embodied in various forms. Exemplary embodiments will be described in detail with reference to the attached drawings, such that they may be easily put into practice by those skilled in the art.

Figure 1:
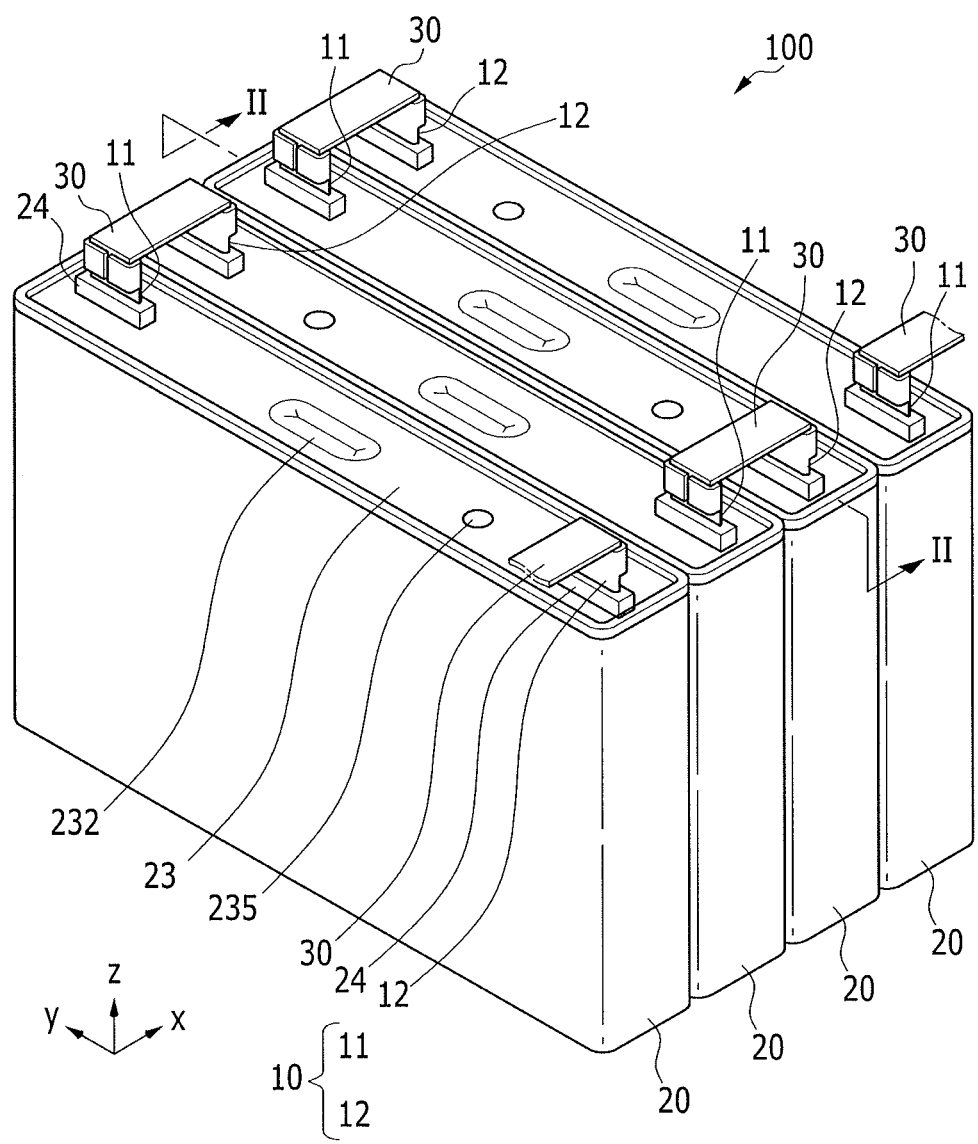
FIG. 1 illustrates a perspective view of a battery module according to a first exemplary embodiment.

FIG. 1 illustrates a perspective view of a battery module according to a first exemplary embodiment.

As shown in FIG. 1, a battery module 100 may include a plurality of rechargeable batteries 20 including protruding terminals 10, and a plurality of bus bars 30 for electrically connecting the terminals 10. Each terminal 10 includes a positive terminal 11 and a negative terminal 12.

The rechargeable batteries 20 may be stacked, e.g., arranged, in parallel in a side direction (x-axis direction of FIG. 1), so that wide fronts of the rechargeable batteries 20 may face each other. The rechargeable batteries 20 may be coupled in series by the bus bars 30. In detail, positive terminals 11 and negative terminals 12 of neighboring rechargeable batteries 20 are alternately disposed, and the bus bar 30 is installed at the positive terminal 11 of a first side rechargeable battery 20 and the negative terminal 12 of a neighboring rechargeable battery 20. In other words, as will be apparent to a person of ordinary skill in the art from the foregoing description and from the drawing, the bus bar 30 may connect a positive terminal 11 of a one rechargeable battery 20 to a negative terminal 12 of a neighboring rechargeable battery 20 along the x-axis.

Figure 2:
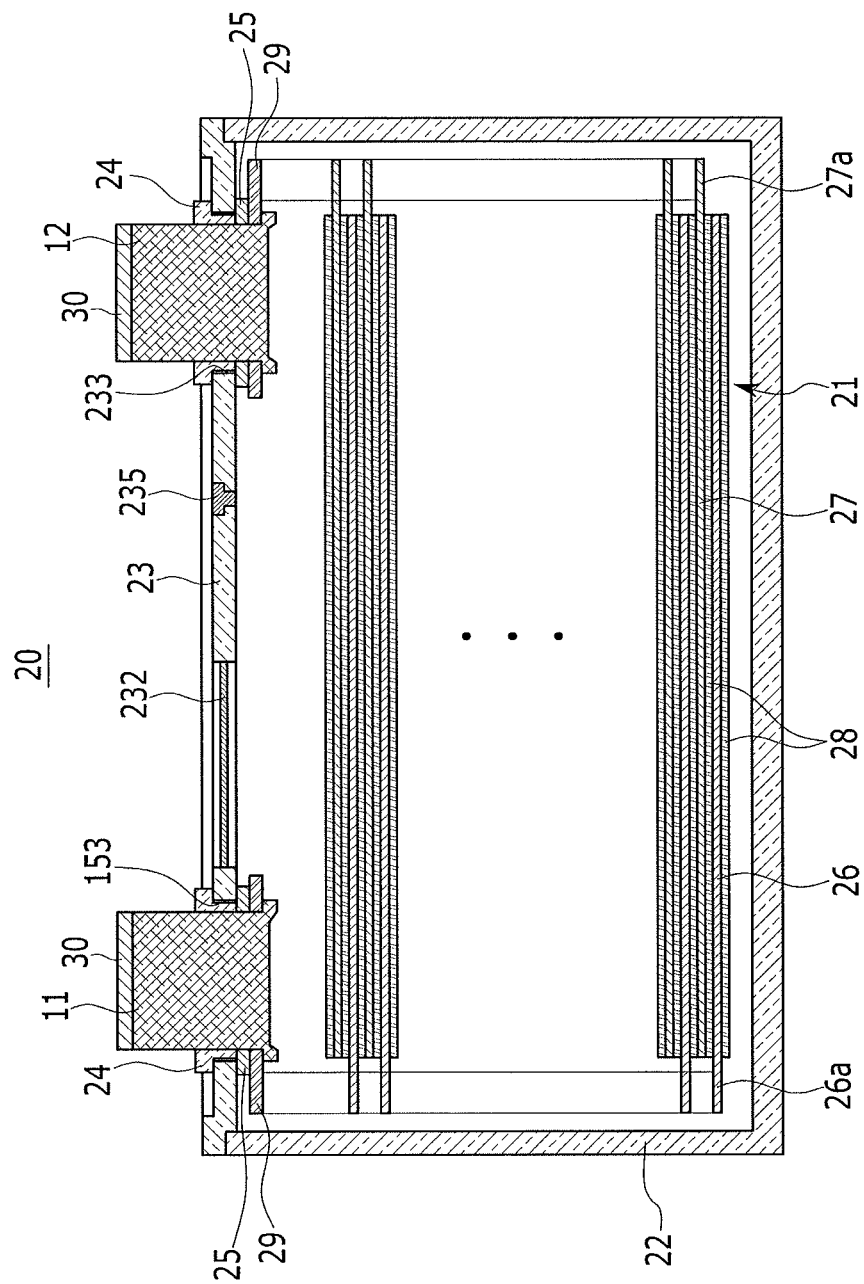
FIG. 2 illustrates a cross-sectional view along line II-II of FIG. 1.

FIG. 2 illustrates a cross-sectional view along line II-II of FIG. 1. Referring to FIG. 2, each rechargeable battery 20 may include the positive terminal 11 and the negative terminal 12.

The rechargeable battery 20 may include an electrode assembly 21 connected to the positive terminal 11 and the negative terminal 12, a case 22 receiving the electrode assembly 21 and electrically connected to (not shown), e.g., the positive terminal 11, a cap plate 23 for covering an opening formed in a first side of the case 22, an external insulator 24 installed on an external side of the cap plate 23, and an internal insulator 25 installed on an internal side of the cap plate 23.

The electrode assembly 21 may include a positive electrode 26 and a negative electrode 27 on respective sides of a separator 28, which is an insulator, and the positive electrode 26, the negative electrode 27, and the separator 28 may be spirally wound to have a jellyroll shape. The positive electrode 26 and the negative electrode 27 may include a coated region generated by coating an active material on a current collector formed with a thin-plate metal foil, and uncoated regions 26a and 27a in which the active material is not coated. The uncoated regions 26a and 27a may be formed on opposite ends of the positive electrode 26 and the negative electrode 27 in a length direction, respectively. The uncoated regions 26a and 27a may be connected to the positive terminal 11 and the negative terminal 12, respectively, through current collecting members 29.

The case 22 may form, e.g., define, the entire exterior of the rechargeable battery 20, and it may be made of a conductive metal, e.g., aluminum, an aluminum alloy, or nickel-plated steel. The case 22 may form, e.g., define, a space for receiving the electrode assembly 21. For example, the case 22 may be formed to have a hexahedron shape.

The cap plate 23 may be made of a thin planar material, and may be combined to an opening formed in the first side of the case 22 to close and seal the opening. The cap plate 23 may have an electrolyte injection opening (not shown) for injecting an electrolyte solution into the closed and sealed internal space of the case 22. The electrolyte injection opening may be sealed by a sealing stopper when the electrolyte solution is injected into it. The cap plate 23 may have a vent unit 232 that is incised to rupture according to a predetermined internal pressure to prevent explosion of the rechargeable battery 20.

The cap plate 23 may include a pair of terminal holes 233, to which the positive terminal 11 and the negative terminal 12 are respectively fastened. The positive terminal 11 and the negative terminal 12 may be provided with the external insulator 24 and the internal insulator 25, which are fastened to the terminal holes 23 of the cap plate 23 in an insulated manner, and are connected to the current collecting members 29 inside the case 22. Therefore, the positive terminal 11 and the negative terminal 12 are electrically connected to the electrode assembly 21 through the current collecting members 29. A band 31 (FIG. 3) for combination with the terminal 10 is formed on the bus bar 30, as will be explained in more detail below with reference to FIG. 3.

Figure 3:
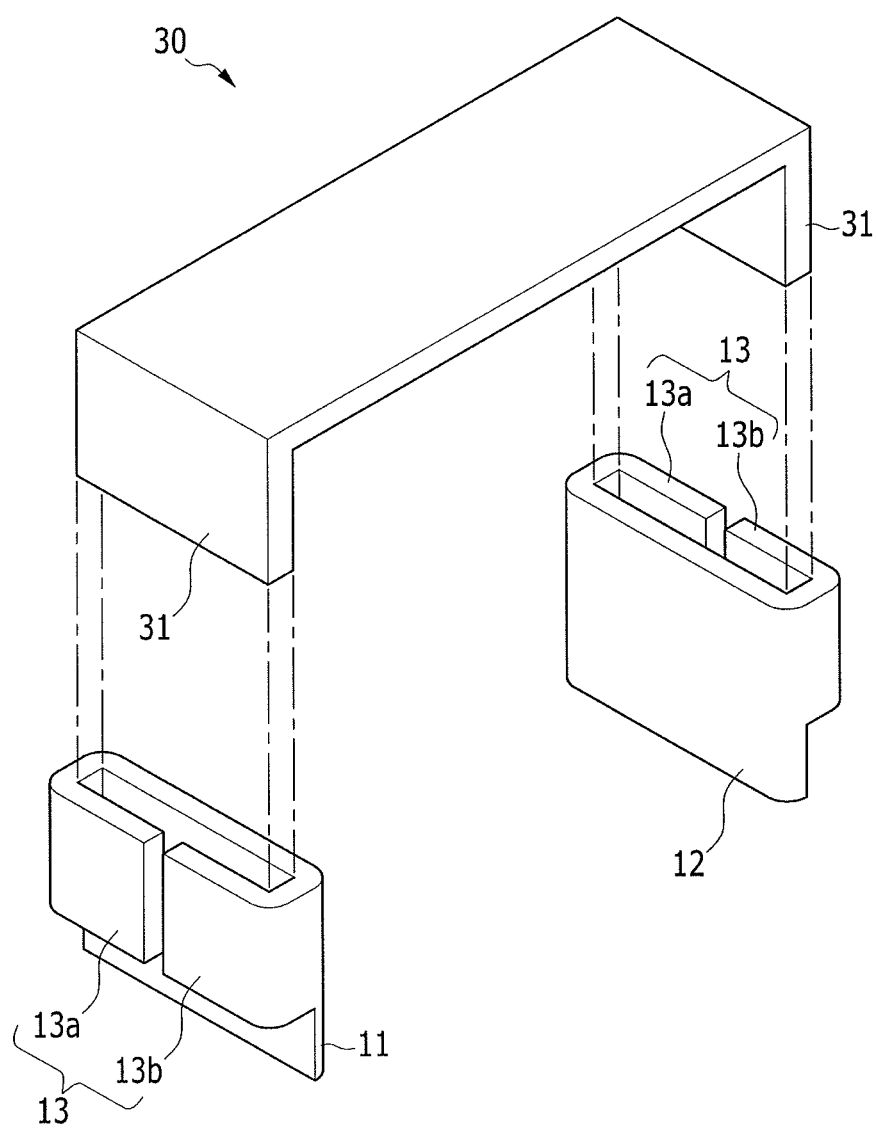
FIG. 3 illustrates an exploded perspective view of a combination of a terminal with a bus bar of FIG. 1.

FIG. 3 illustrates an exploded perspective view of a combination of the bus bar 30 with the band 31 to the terminal 10, i.e., to positive and negative terminals 11 and 12. As shown in FIG. 3, the band 31 can be formed to be bent in a direction of the terminal 10 from both ends of the bus bar 30. In other words, as will be apparent to a person of ordinary skill in the art from the foregoing description and from the drawing, the bus bar 30 may be a flat plate with the band 31 extending, e.g., perpendicularly, from opposite ends of the flat plate toward the positive and negative terminals 11 and 12, respectively, e.g., the bus bar 30 with the band 31 may have a Π shape.

A terminal clamp 13 for insertion and combination of the band 31 may be formed on the terminal 10. As shown in FIG. 3, the terminal clamp 13 may include a first elastic piece 13a and a second elastic piece 13b that are formed on the terminal 10, i.e., both first and second elastic pieces 13a and 13b are formed on each of the positive and negative terminals 11 and 12.

In detail, the first elastic piece 13a extends from one side of the terminal 10 and protrudes to form a space in which the band 31 is inserted between the terminal 10 and the first elastic piece 13a. That is, a first end of the first elastic piece 13a is connected to a side of the terminal 10, and a second end of the first elastic piece 13a is bent to form a space between the first elastic piece 13a and a surface of the terminal 10 and to cover a part of the terminal 10. For example, as will be apparent to a person of ordinary skill in the art from the foregoing description and from the drawing, the first elastic piece 13a may have a bent shape, e.g., may have an approximate L-shape, that extends from an edge of the terminal 10 and bends to overlap the terminal 10, such that a space is defined between the terminal 10 and the bent portion of the first elastic piece 13a. The first elastic piece 13a is made of a material with an elastic force for pressurizing, e.g., forcing, the band 31 to contact the terminal 10, and it may be formed of the same metal material as the terminal 10.

The second elastic piece 13b may be formed to have the same size and shape as the first elastic piece 13a, and extends from another side of the terminal 10 and protrudes to form a space in which the band 31 is inserted between the terminal 10 and the second elastic piece 13b. That is, a first end of the second elastic piece 13b is connected to the side of the terminal 10, and a second end thereof is bent to form a space between the surface of the terminal 10 and the second elastic piece 13b and cover a part of the terminal 10.

For example, as will be apparent to a person of ordinary skill in the art from the foregoing description and from the drawing, the first and second elastic pieces 13a and 13b may overlap different portions of a same terminal 10 to define an insertion space between the terminal 10 and the first and second elastic pieces 13a and 13b. Therefore, the band 31 of the bus bar 30 may be inserted into the insertion space defined between the terminal 10 and the first and second elastic pieces 13a and 13b. The second elastic piece 13b together with the first elastic piece 13a pressurize, e.g., push, the band 31 to contact the terminal 10, e.g., via the insertion space defined between the terminal 10 and the first and second elastic pieces 13a and 13b, so that the terminal 10 may be electrically connected to the bus bar 30.

The band 31 of the bus bar 30 is connected, e.g., directly connected, to the side of the terminal 10, as the first elastic piece 13a and the second elastic piece 13b exert elastic force toward the band 31 and the terminal 10. Therefore, the bus bar 30 can be electrically connected to the terminal 10 through a simple configuration without using an additional coupler, e.g., without using bolts or welding, thereby reducing manufacturing costs.

Also, the terminal 10 is elastically connected to the bus bar 30, so when an impact is applied, no crack is generated. Therefore, mechanical durability of the battery module is improved. Further, a contact area of the terminal 10 and the bus bar 30 is increased to improve the heat radiation property of the rechargeable battery.

Figure 4:
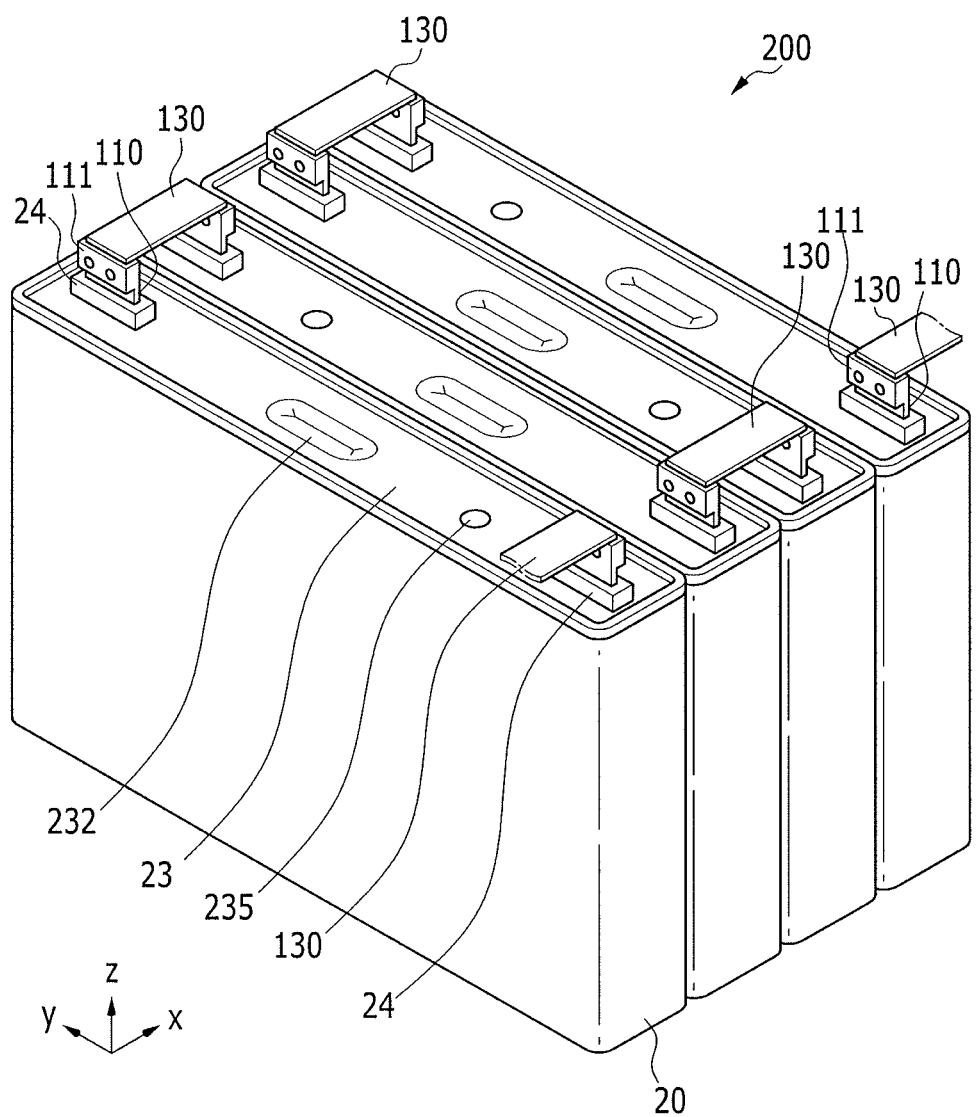
FIG. 4 illustrates a perspective view of a battery module according to a second exemplary embodiment.
Figure 5:
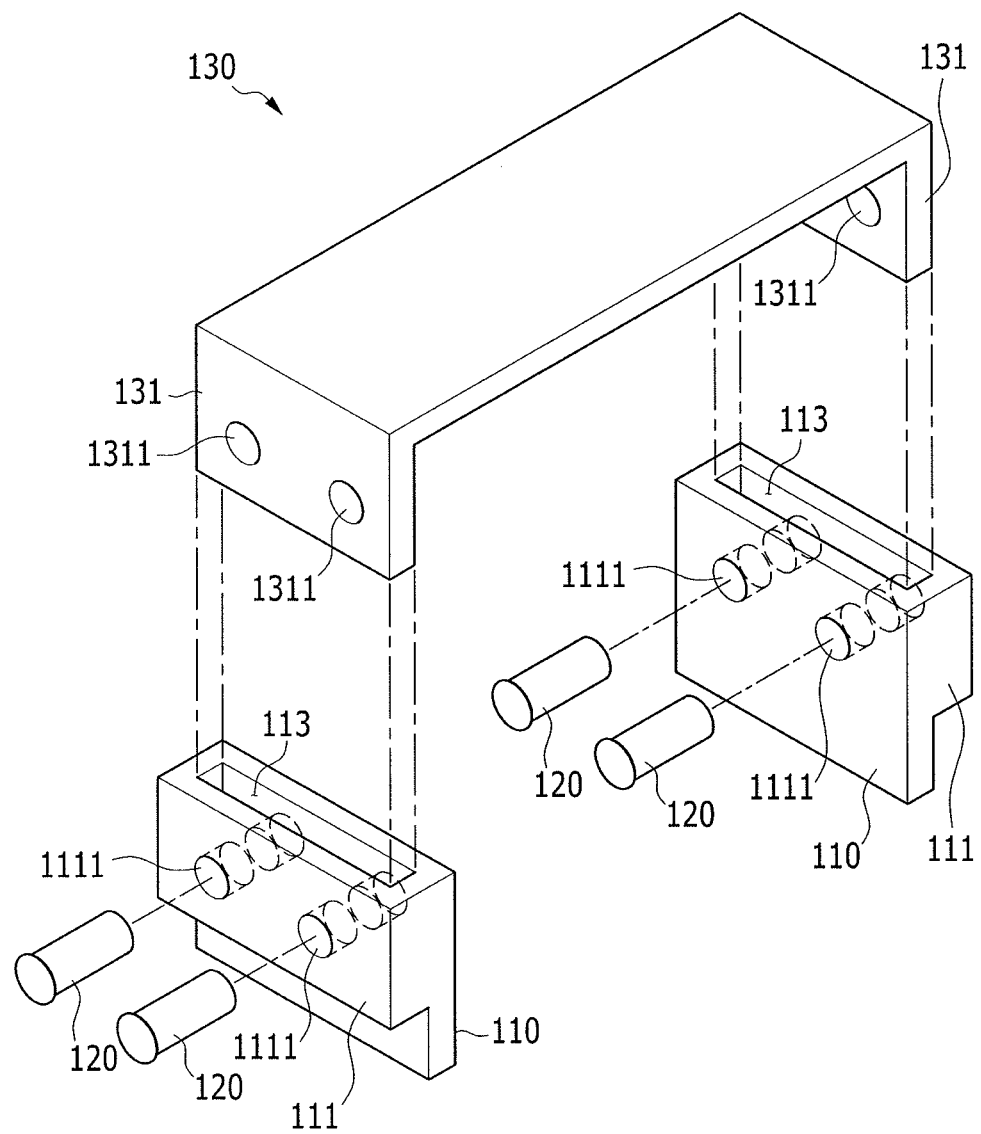
FIG. 5 illustrates an exploded perspective view of insertion of a band of a bus bar into a band inserter formed in a terminal of FIG. 4.

FIG. 4 illustrates a perspective view of a battery module according to a second exemplary embodiment, and FIG. 5 shows an exploded perspective view of insertion of a band of a bus bar into a band inserter formed in a terminal of FIG. 4. The same reference numerals as in FIG. 1 and FIG. 2 represent the same members with the same functions, and components having the same reference numerals will not be described.

As shown in FIG. 4 and FIG. 5, a band inserter 111 is formed on a terminal 110 of a battery module 200 according to the second exemplary embodiment. The band inserter 111 is formed to be thicker than the terminal 110, an opening 113 is formed upward, and a space into which the band 131 is inserted is formed inside. In other words, as will be apparent to a person of ordinary skill in the art from the foregoing description and from the drawing, the band inserter 111 may be a continuous Π-shaped frame on a side surface of the terminal 10, so a space with the opening 113 is defined for the band 131 between the side surface of the terminal 10 and the band inserter 111. Therefore, the band 131 of the bus bar 130 is inserted into the band inserter 111 to electrically connect the terminal 110 and the bus bar 130.

Here, the terminal 110 and the bus bar 130 may be fixed with a coupler for safe connection. For example, a rivet 120 may be used as the coupler.

In order to fix the terminal 110 and the bus bar 130 using the rivet 120, a first coupling hole 1311 may be formed in the band 131, and a second coupling hole 1111 may be formed in the band inserter 111. Therefore, when the band 131 is inserted into the band inserter 111, the rivet 120 is pushed into the first coupling hole 1311 and the second coupling hole 1111 to stabilize electrical connection of the terminal 110 and the bus bar 130.

By the above-described configuration, the terminal 110 is securely connected to the bus bar 130 without bolts or welding.

Figure 6:
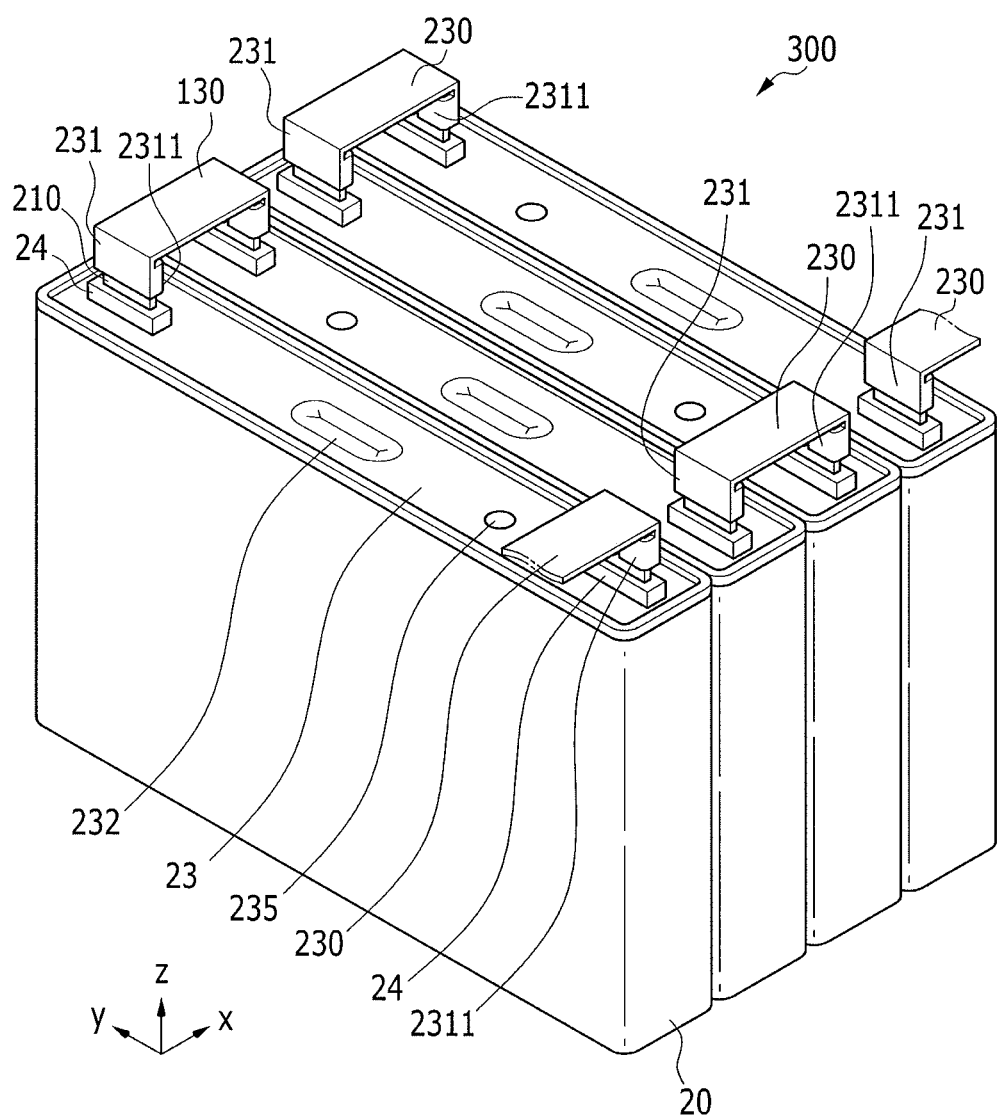
FIG. 6 illustrates a perspective view of a battery module according to a third exemplary embodiment.
Figure 7:
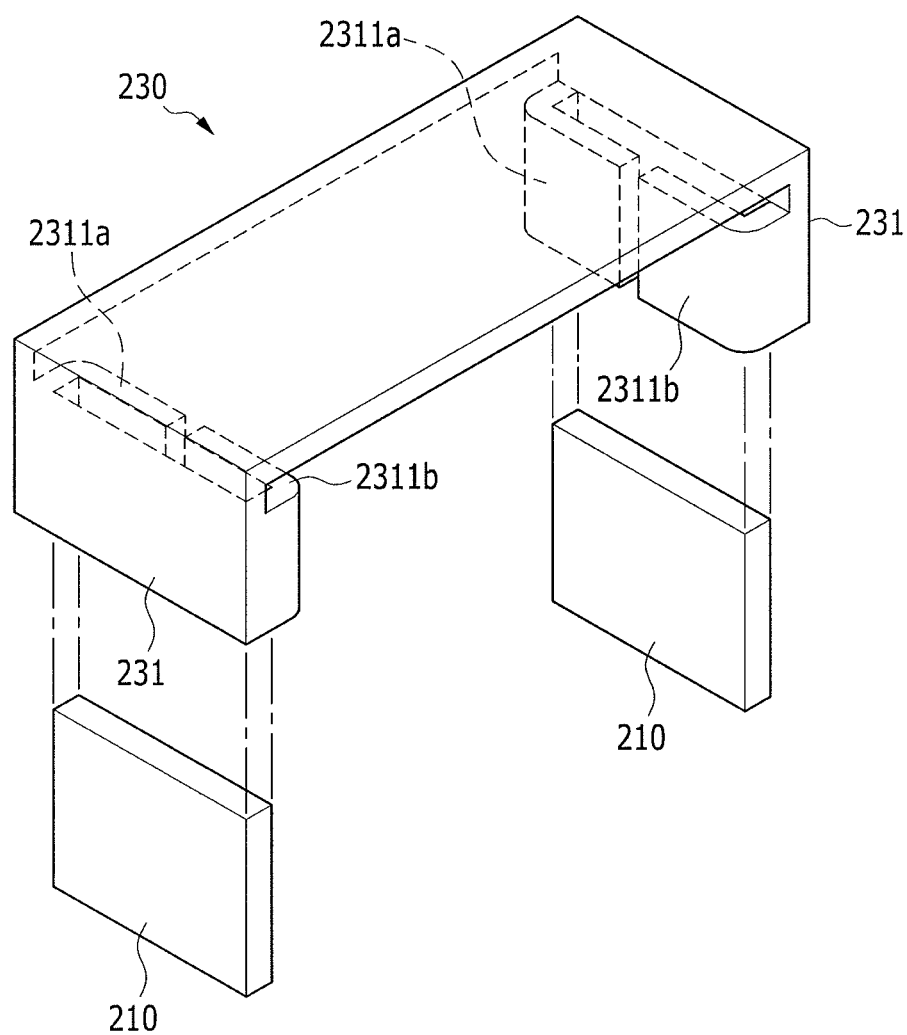
FIG. 7 illustrates an exploded perspective view of insertion of a band of a bus bar into a band inserter formed in a terminal of FIG. 6.

FIG. 6 illustrates a perspective view of a battery module according to a third exemplary embodiment, and FIG. 7 shows an exploded perspective view of insertion of a band of a bus bar into a band inserter formed in a terminal of FIG. 6. The same reference numerals as in FIG. 1 to FIG. 5 represent the same members with the same functions, and components having the same reference numerals will not be described.

As shown in FIG. 6 and FIG. 7, a bus bar clamp 2311 that is electrically connected with a terminal 210 is formed on a band 231 of a bus bar 230 of a battery module 300 according to the third exemplary embodiment. As shown in FIG. 7, the bus bar clamp 2311 includes a first elastic unit 2311a and a second elastic unit 2311b formed on the band 231 to receive the terminal 210.

The first elastic unit 2311a extends at one side of the band 231, and protrudes to form a space into which the terminal 210 is inserted. That is, a first end of the first elastic unit 2311a is connected to a side of the band 231, and a second end thereof is extended and bent to cover a part of the band 231. The first elastic unit 2311a is made of a material with an elastic force for pressurizing, e.g., pushing, the terminal 210 to contact the band 231, and it may be formed of the same metal material as the bus bar 230.

The second elastic unit 2311b may be formed with the same function and shape as the first elastic unit 2311a, and it may extend from a second side of the band 231 and protrude to form a space into which the terminal 210 is inserted between the second elastic unit 2311b and the band 231. That is, the second elastic unit 2311b may include a first end connected to the side of the band 231, and a second end bent and extending to cover a part of the band 231 and to form a space between the second elastic unit 2311b and the band 231. The second elastic unit 2311b, together with the first elastic unit 2311a, pushes the terminal 210 to contact, e.g., to directly contact, the band 231 and electrically connect the terminal 210 and the bus bar 230.

The band 231 of the bus bar 230 is connected to the side of the terminal 210 by the elastic force exerted by the first elastic unit 2311a and the second elastic unit 2311b. Therefore, the bus bar 230 is electrically connected to the terminal 210 according to a simple configuration without using an additional coupler, e.g., a bolt, or welding, thereby reducing the cost. The terminal 210 is elastically connected to the bus bar 230, so defects, e.g., cracks, may not be generated and mechanical durability may be improved. The contact area of the terminal 210 and the bus bar 230 may be increased to improve of the heat radiation property of the rechargeable battery 20.

It is noted that while not illustrated in the figures, as will be apparent to a person of ordinary skill in the art from the foregoing description and from the drawing, the band 231 may include a terminal inserter, rather than the bus bar clamp 2311. That is, the terminal inserter may be a continuous Π-shaped frame on a side surface of the band 231 to define a space, as described previously with respect to the band inserter 111 in FIGS. 4-5.

Figure 8:
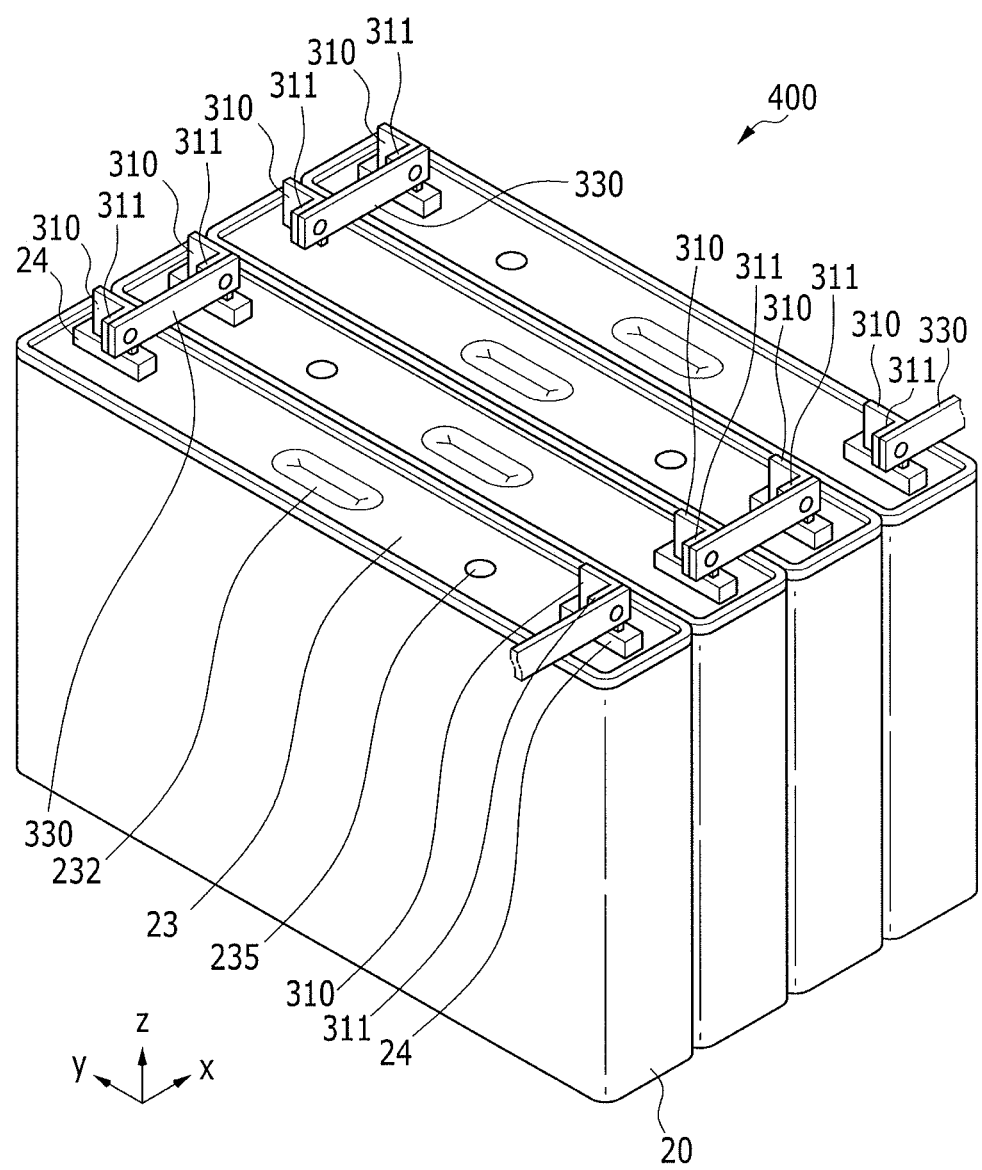
FIG. 8 illustrates a perspective view of a battery module according to a fourth exemplary embodiment.
Figure 9:
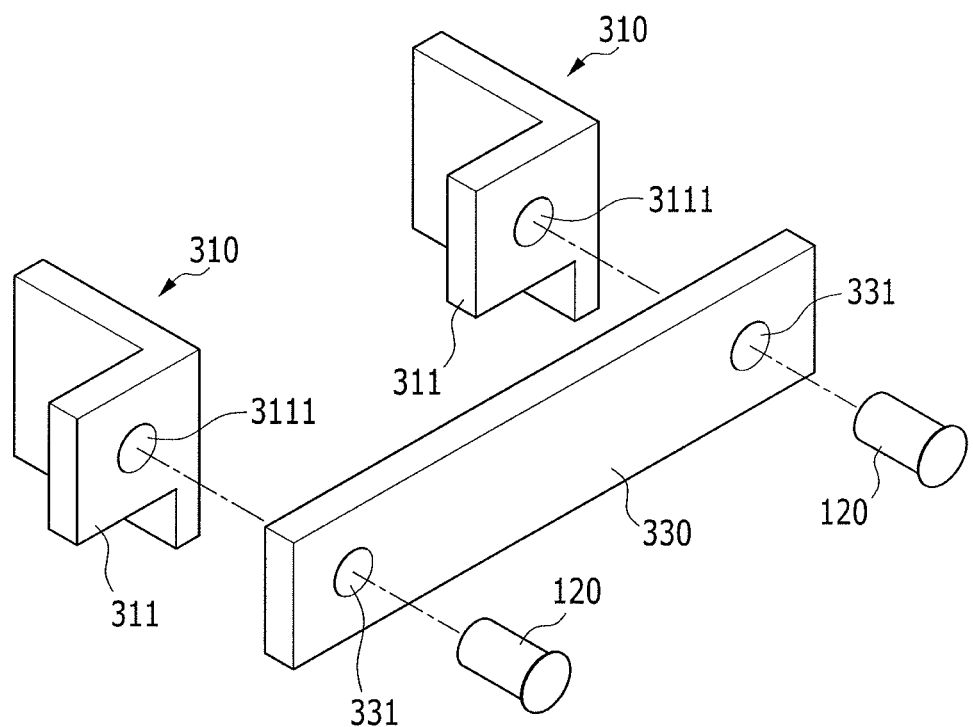
FIG. 9 illustrates an exploded perspective view of combination of a terminal of FIG. 8 and a bus bar.

FIG. 8 illustrates a perspective view of a battery module according to a fourth exemplary embodiment, and FIG. 9 shows an exploded perspective view of a combination of a terminal of FIG. 8 and a bus bar. The same reference numerals as in FIG. 1 to FIG. 7 represent the same members with the same functions, and components having the same reference numerals will not be described.

As shown in FIG. 8 and FIG. 9, a battery module 400 according to the fourth exemplary embodiment may include the plurality of rechargeable batteries 20 with protruding terminals 310, and a plurality of bus bars 330 for electrically connecting the terminals 310. A bent unit 311 that is bent in one direction may be formed on the terminal 310 to connect the terminal 310 to the bus bar 330. For example, as will be apparent to a person of ordinary skill in the art from the foregoing description and from the drawing, the bent unit 311 may be bent perpendicular with respect to the terminal 310, so the bus bar 330 may be in surface contact with two bent units 311 of adjacent rechargeable batteries 20.

In detail, the bus bar 330 may overlap the bent unit 311 in the surface contacted state, and may be attached to the bent unit 311 by using a coupler, e.g., the rivet 120. For this purpose, a first fastening hole 3111 may be formed in the bent unit 311 of the terminal 310, and a second fastening hole 331 may be formed in the bus bar 330. Therefore, while the bus bar 330 surface-contacts the bent unit 311 of the terminal 310, the rivet 120 is pushed into the first fastening hole 3111 and the second fastening hole 331 to stabilize the electrical connection of the terminal 310 and the bus bar 330.

According to embodiments, the bus bar may be connected to the rechargeable batteries terminals without using a bolt or welding, so damage, e.g., cracks, may not be generated, e.g., when an external impact is applied. Further, the bus bar may be connected to the terminals, while maximizing a contact area therebetween, thereby improving the heat radiation property of the rechargeable battery. In addition, when the position of the connected portion of the bus bar and the terminal is varied by an impact, electrically stable connection is allowable.

In contrast, the bus bar in a conventional rechargeable battery is connected to the terminal through mechanical bonding, e.g., welding or bolts, so it may be difficult to improve a degree of connection freedom. Further, when an external impact is applied to the conventional rechargeable battery, the rechargeable battery may be cracked because of a change of the combined position of the bus bar.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of overlapping rechargeable batteries arranged adjacent to each other in a first direction, each rechargeable battery including at least one terminal protruding outside along a second direction normal to a top of the rechargeable battery, and each terminal including a terminal clamp defining a space between the terminal and the terminal clamp; and
a plurality of bus bars electrically connecting terminals of different rechargeable batteries of the plurality of rechargeable batteries, each bus bar of the plurality of bus bars including a flat bent band that is parallel to, in surface contact with, and electrically connected to a respective terminal, the bent band being inserted into the defined space between the terminal and the terminal clamp to be electrically connected to the terminal, the terminal clamp including:
a first elastic piece extending from a first side of the terminal and bending to overlap and be parallel to the terminal, a first portion of the bent band being between the terminal and a portion of the first elastic piece that is parallel to the terminal; and
a second elastic piece extending from a second side of the terminal and bending to overlap and be parallel to the terminal, a second portion of the bent band being between the terminal and a portion of the second elastic piece that is parallel to the terminal, the first and second sides of the terminal being spaced apart from each other along a third direction perpendicular to each of the first and second directions,
wherein the first portion of the bent band and the second portion of the bent band are in direct contact with each other and level with each other, the first and second portions of the bent band being adjacent to each other along the third direction, and
wherein both the first elastic piece and the second elastic piece contact the bent band inserted into the defined space between the terminal and the terminal clamp, the bent band completely filling the defined space in the first direction, and the first and second elastic pieces maintaining contact with the bent band during an entire operation of the battery module.

2. The battery module as claimed in claim 1, wherein the bus bar further comprises a bus bar clamp defining a space between the bent band and the bus bar clamp, the terminal being inserted into the defined space to be electrically connected to the bent band.

3. The battery module as claimed in claim 2, wherein the bus bar clamp includes:
a first elastic piece extending from a first side of the bent band and bending to overlap the bent band, the first elastic piece pushing the terminal toward the bent band; and
a second elastic piece extending from a second side of the bent band and bending to overlap the bent band, the second elastic piece pushing the terminal toward the bent band.

4. The battery module as claimed in claim 1, wherein the terminal includes:
a band inserter defining a space between the terminal and the band inserter, the bent band being inserted into the defined space to be electrically connected to the terminal; and
a coupler inserted through the band inserter and the bent band.

5. The battery module as claimed in claim 1, wherein the bus bar further comprises:
a terminal inserter defining a space between the bent band and the terminal inserter, the terminal being inserted into the defined space to be electrically connected to the bent band; and
a coupler inserted through the terminal inserter and the terminal.

6. The battery module as claimed in claim 1, wherein both the first elastic piece and the second elastic piece directly contact the bent band inserted into the defined space between the terminal and the terminal clamp.

7. The battery module as claimed in claim 1, wherein the first and second elastic pieces are bendable toward and away from the terminal.

8. The battery module as claimed in claim 7, wherein the first and second elastic pieces are bendable at the first and second sides of the terminal, respectively.

9. The battery module as claimed in claim 1, wherein the first and second elastic pieces are formed of a same material as the terminal.

10. The battery module as claimed in claim 1, wherein:
a length of each of the first and second elastic pieces along the second direction is longer than a half of a length of the bent band in the second direction.

11. The battery module as claimed in claim 1, wherein:
a combined length of the first and second elastic pieces along the third direction is longer than a half of a length of the bent band in the third direction.

12. The battery module as claimed in claim 1, wherein the first and second elastic pieces have a permanent connection with the bent band during the entire operation of the battery module.

13. The battery module as claimed in claim 1, wherein the first elastic piece and the second elastic piece extend directly from a same terminal.

14. The battery module as claimed in claim 1, wherein each one of the first elastic piece and the second elastic piece is in direct contact with at least two different surfaces of the bent band, respectively.

15. The battery module as claimed in claim 1, wherein a combined structure of the terminal and the first and second elastic pieces have a frame shape, as viewed from a top view, the bent band being insertable into the frame shape.

16. A battery module, comprising:
a plurality of overlapping rechargeable batteries arranged adjacent to each other in a first direction, the plurality of rechargeable batteries being arranged in parallel in a side direction such that wide fronts of the plurality of rechargeable batteries face each other, each rechargeable battery including at least one terminal protruding outside along a second direction normal to a top of the rechargeable battery; and
a plurality of bus bars electrically connecting terminals of different rechargeable batteries of the plurality of rechargeable batteries, each bus bar of the plurality of bus bars including a flat bent band that is parallel to, in surface contact with, and electrically connected to a respective terminal,
each terminal including a terminal clamp defining a space between the terminal and the terminal clamp, the bent band being inserted into the defined space between the terminal and the terminal clamp to be electrically connected to the terminal, the terminal clamp including:
  a first elastic piece extending from a first side of the terminal and bending to overlap and be parallel to the terminal, a first portion of the bent band being between the terminal and a portion of the first elastic piece that is parallel to the terminal; and
  a second elastic piece extending from a second side of the terminal and bending to overlap and be parallel to the terminal, a second portion of the bent band being between the terminal and a portion of the second elastic piece that is parallel to the terminal, the first and second sides of the terminal being spaced apart from each other along a third direction perpendicular to each of the first and second directions,
  wherein the first portion of the bent band and the second portion of the bent band being in direct contact with each other and level with each other, the first and second portions of the bent band being adjacent to each other along the third direction, and
  wherein both the first elastic piece and the second elastic piece contact the bent band inserted into the defined space between the terminal and the terminal clamp, the bent band completely filling the defined space in the first direction, and the first and second elastic pieces maintaining contact with the bent band during an entire operation of the battery module.

17. The battery module as claimed in claim 16, wherein both the first elastic piece and the second elastic piece directly contact the bent band inserted into the defined space between the terminal and the terminal clamp.

18. A battery module, comprising:
a plurality of overlapping rechargeable batteries arranged adjacent to each other in a first direction, each rechargeable battery including a positive terminal and a negative terminal protruding outside along a second direction normal to a top of the rechargeable battery; and
a plurality of bus bars electrically connecting terminals of different rechargeable batteries of the plurality of rechargeable batteries, each bus bar of the plurality of bus bars including a flat bent band that is parallel to, in surface contact with, and electrically connected to a respective terminal, a bus bar from among the plurality of bus bars connecting a positive terminal of a first rechargeable battery to a negative terminal of a neighboring rechargeable battery along the one direction,
each terminal including a terminal clamp defining a space between the terminal and the terminal clamp, the bent band being inserted into the defined space between the terminal and the terminal clamp to be electrically connected to the terminal, the terminal clamp including:
  a first elastic piece extending from a first side of the terminal and bending to overlap and be parallel to the terminal, a first portion of the bent band being between the terminal and a portion of the first elastic piece that is parallel to the terminal; and
  a second elastic piece extending from a second side of the terminal and bending to overlap and be parallel to the terminal, a second portion of the bent band being between the terminal and a portion of the second elastic piece that is parallel to the terminal, the first and second sides of the terminal being spaced apart from each other along a third direction perpendicular to each of the first and second directions,
  wherein the first portion of the bent band and the second portion of the bent band being in direct contact with each other and level with each other, the first and second portions of the bent band being adjacent to each other along the third direction, and
  wherein both the first elastic piece and the second elastic piece contact the bent band inserted into the defined space between the terminal and the terminal clamp, the bent band completely filling the defined space in the first direction, and the first and second elastic pieces maintaining contact with the bent band during an entire operation of the battery module.

19. The battery module as claimed in claim 18, wherein positive terminals and negative terminals of neighboring rechargeable batteries are alternately disposed.

20. The battery module as claimed in claim 18, wherein both the first elastic piece and the second elastic piece directly contact the bent band inserted into the defined space between the terminal and the terminal clamp.

* * * * *